United States Patent [19]

Marchesini

[11] Patent Number: 4,980,969

[45] Date of Patent: Jan. 1, 1991

[54] ROTATING MULTI-STATION MACHINE FOR INSERTING AN UNDER-PLUG IN VIALS AND SIMILAR CONTAINERS

[76] Inventor: Massimo Marchesini, Via S. Bartolomeo, 17 Pianaro (Bologna), Italy

[21] Appl. No.: 366,528

[22] Filed: Jun. 14, 1989

[30] Foreign Application Priority Data

Jun. 17, 1988 [IT] Italy ................................ 3510 A/88

[51] Int. Cl.[5] .............................................. B23P 19/00

[52] U.S. Cl. ........................................ 29/773; 29/786; 53/151

[58] Field of Search ......................... 29/773, 786, 792; 53/151

[56] References Cited

U.S. PATENT DOCUMENTS

| | | | |
|---|---|---|---|
| 3,214,886 | 11/1965 | Strunck . | |
| 3,309,838 | 3/1967 | Wilhere . | |
| 3,800,400 | 4/1974 | Mistarz et al. | 29/773 X |
| 4,441,955 | 4/1984 | Richardson et al. | 29/773 X |
| 4,870,748 | 10/1989 | Hensgen et al. | 29/773 |

FOREIGN PATENT DOCUMENTS

| | | |
|---|---|---|
| 1532561 | 4/1970 | Fed. Rep. of Germany . |
| 3118462 | 9/1981 | Fed. Rep. of Germany . |
| 2394452 | 12/1979 | France . |

OTHER PUBLICATIONS

FA. Hoefliger & Karg: Folder "Flaschenfull-und verschliess Maschinen", Aug. 1982.

*Primary Examiner*—Timothy V. Eley
*Attorney, Agent, or Firm*—Darby & Darby

[57] ABSTRACT

In a rotating multi-station machine for inserting an under-plug and plug in vials, the periphery of a rotating drum features gripping means for vials, and a series of angularly equidistant insertion devices for inserting the under-plugs and plugs in the necks of the vials, whereas a distributor carousel for vials and under-plugs supplies them to the rotating drum. Feed means feed vials and under-plugs to the distributor carousel, and a further distributor carousel supplies plugs to the rotating drum where removal means remove the plugged vials. The insertion devices comprise gripping and insertion means for the under-plug, featuring a swinging arm that moves between a work position upon the neck of the vial and a vial-disengaged position, and gripping and insertion means for the plugs.

18 Claims, 11 Drawing Sheets

Fig.3a
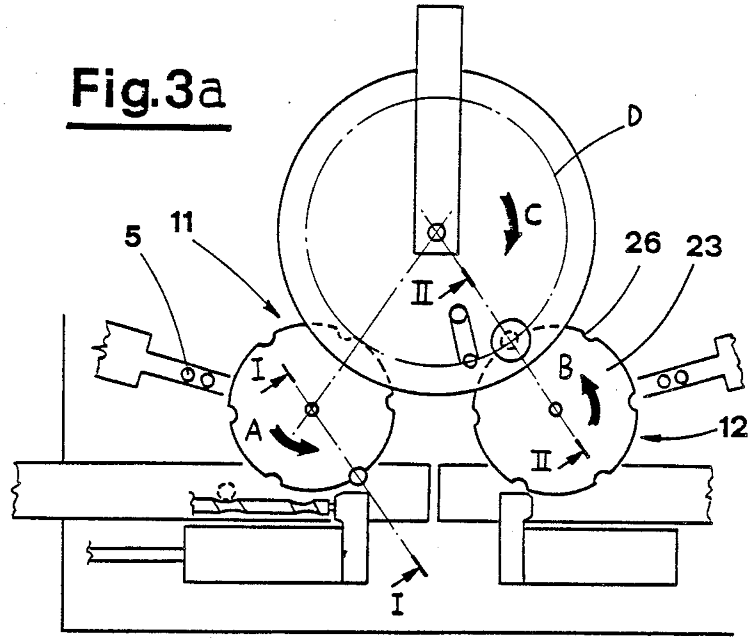
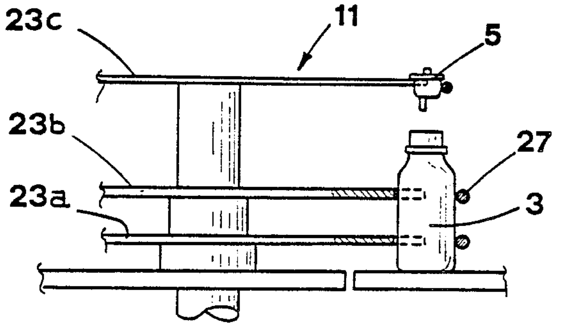
Fig. 6
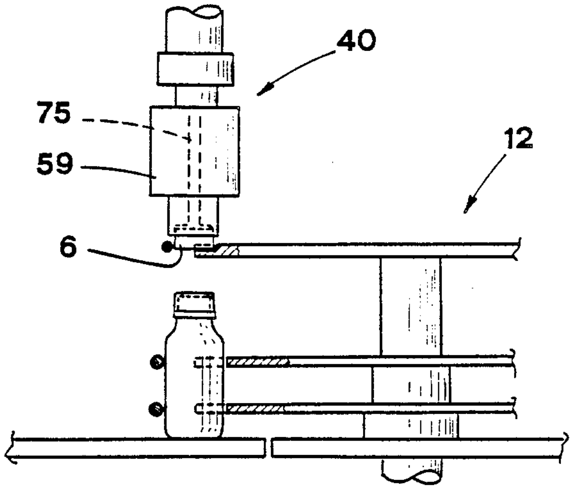
Fig. 7

Fig.12
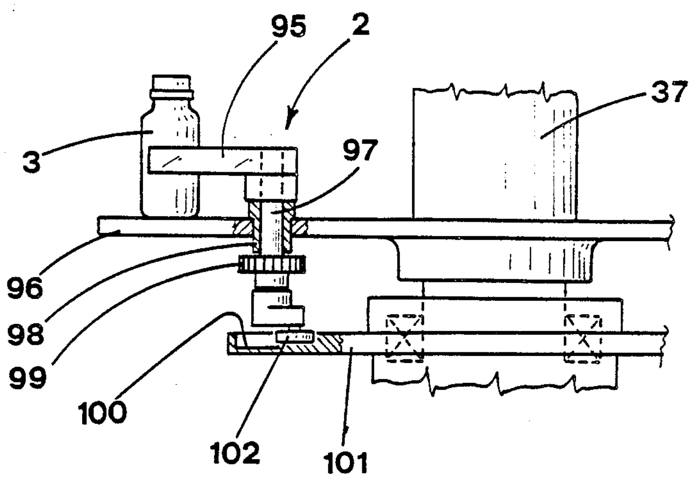
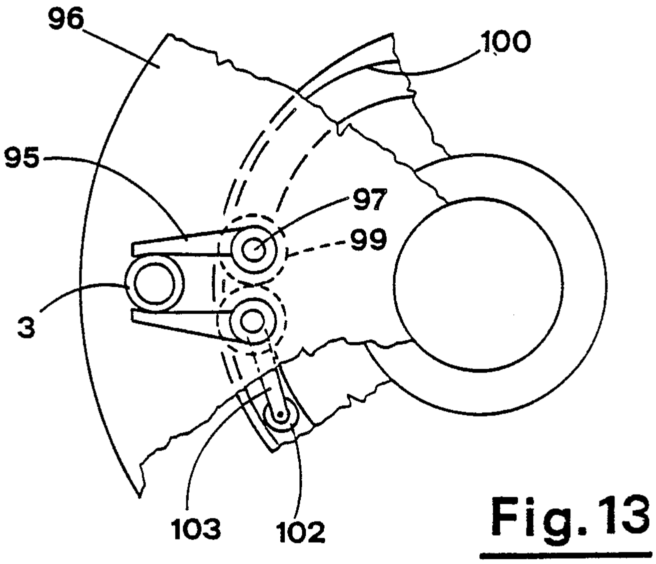
Fig.13

ROTATING MULTI-STATION MACHINE FOR INSERTING AN UNDER-PLUG IN VIALS AND SIMILAR CONTAINERS

BACKGROUND OF THE INVENTION

The present invention concerns a rotating multi-station machine for inserting under-plugs and plugs in vials and similar containers.

DESCRIPTION OF THE PRIOR ART

It is known that vials for pharmaceutical and similar products often feature a sealing plug and under-plug, incorporating a medicine dropper, for example. At present automatic machines generally fitted with a series of carousels effect, in succession, the different operating phases for inserting the under-plugs and plugs in the vials, either by screw-fitting them or inserting them under pressure. The vials to be plugged, in particular, are supplied to a first device for inserting the under-plugs, and then transferred to a second device for inserting the sealing plug.

The above-mentioned machines thus have a complex structure and bulky dimensions.

Furthermore the succession of transfers required significantly increases the time involved, also increasing the risk of possible malfunctions.

SUMMARY OF THE INVENTION

The object of the present invention is to solve the problem described above, proposing a machine that makes it possible to insert the under-plugs and plugs in the vials using one single device.

A further object of the present invention is to propose a machine that adopts a simple technical solution, has compact dimensions and operates with complete reliability.

The above objects are achieved, in accordance with the invention, by the present rotating multistation machine for inserting an under-plug and plug in vials and similar containers, characterised by the fact that it includes a rotating drum, the periphery of which features gripping means for the said vials, and a series of angularly equidistant insertion devices for inserting the said under-plugs and plugs in the necks of related vials, a distributor carousel for the said vials and said under-plugs, which supplies them to the said rotating drum, feed means for feeding the said vials and said under-plugs to the said distributor carousel, a further distributor carousel for supplying the said plugs to the said rotating drum, and removal means for plugged vials; as well as by the fact that the said insertion devices comprise, respectively, a gripping and insertion means for the under-plug, featuring a swinging arm that moves between a work position upon the neck of the vial and a vial-disengaged position in which it is disengaged from the neck of the vial, and by a gripping and insertion means for inserting the plugs, able to move along its axis above the said vials.

The machine as in the present invention effects the insertion of the under-plug and plug in the vial by means of one single device operated in different operating stations by a single rotating means. The machine has extremely compact dimensions and can be incorporated in an optimum manner in a vial packaging line.

BRIEF DESCRIPTION OF THE DRAWINGS

The characteristics of the invention emerge in greater detail in the description of a preferred form of the rotating multi-station machine for inserting under-plugs and plugs in vials, illustrated in the enclosed tables of drawings, in which.

Figure 8:
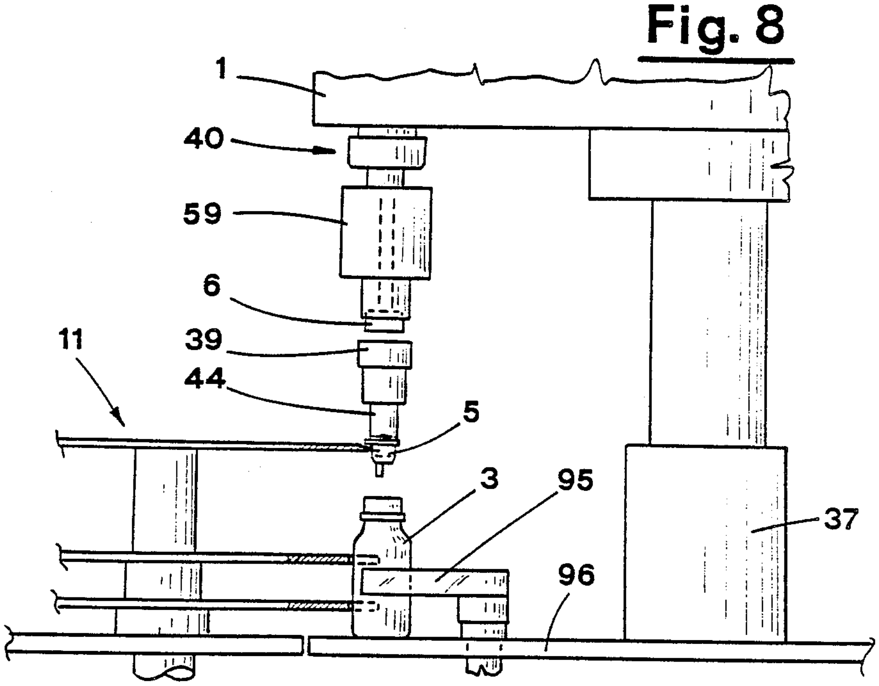
Figure 9:
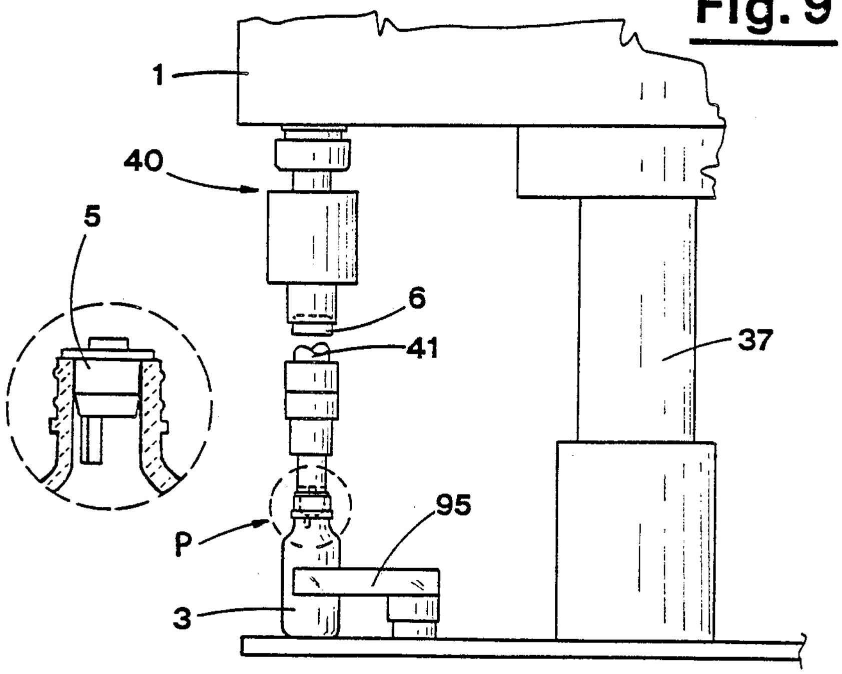
Figure 10:
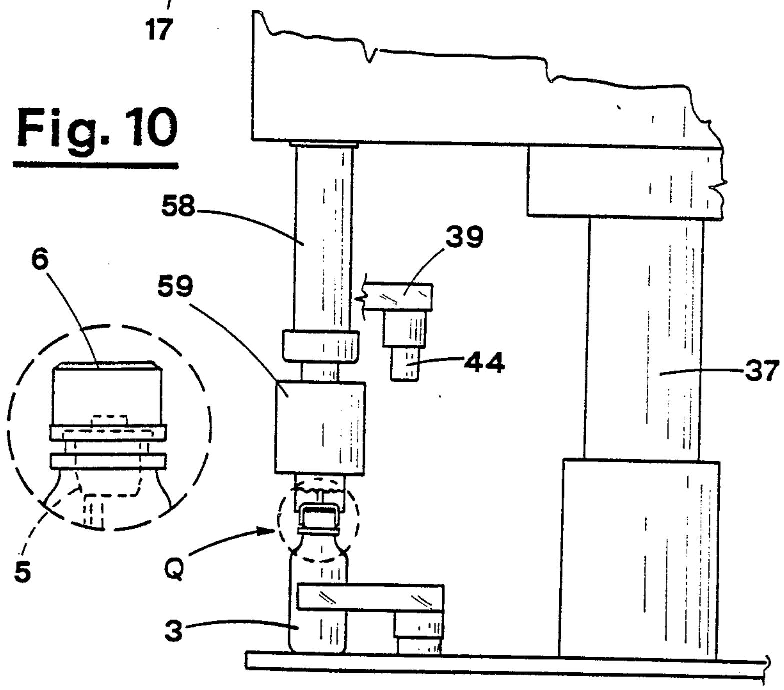
Figure 3E:
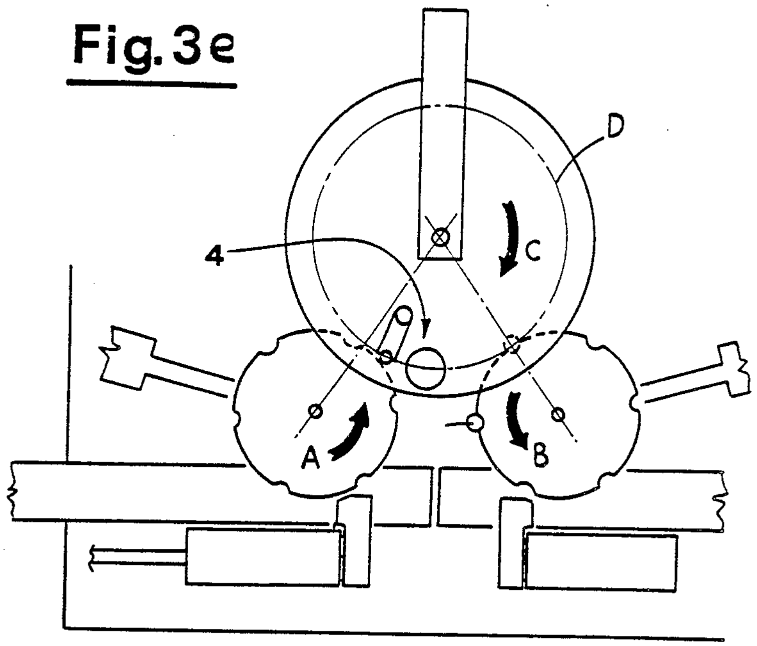
Figure 11:
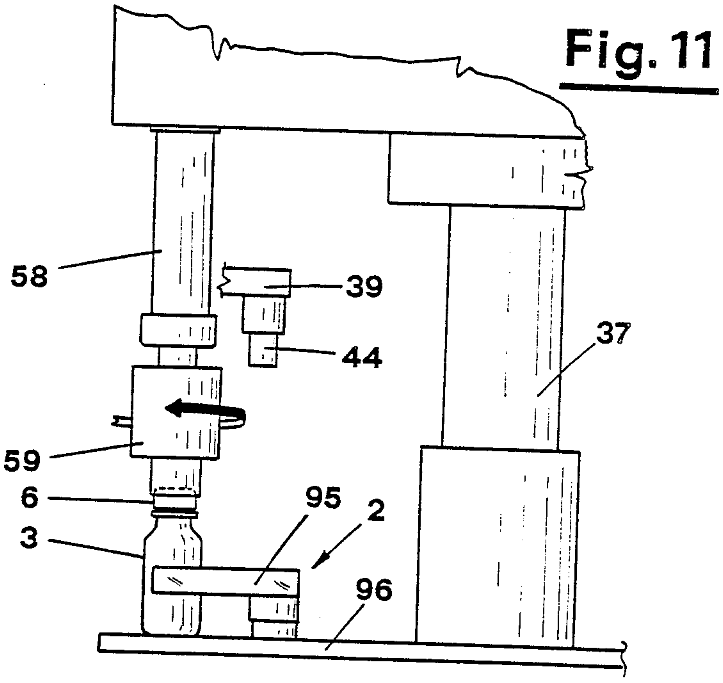
Figure 4:
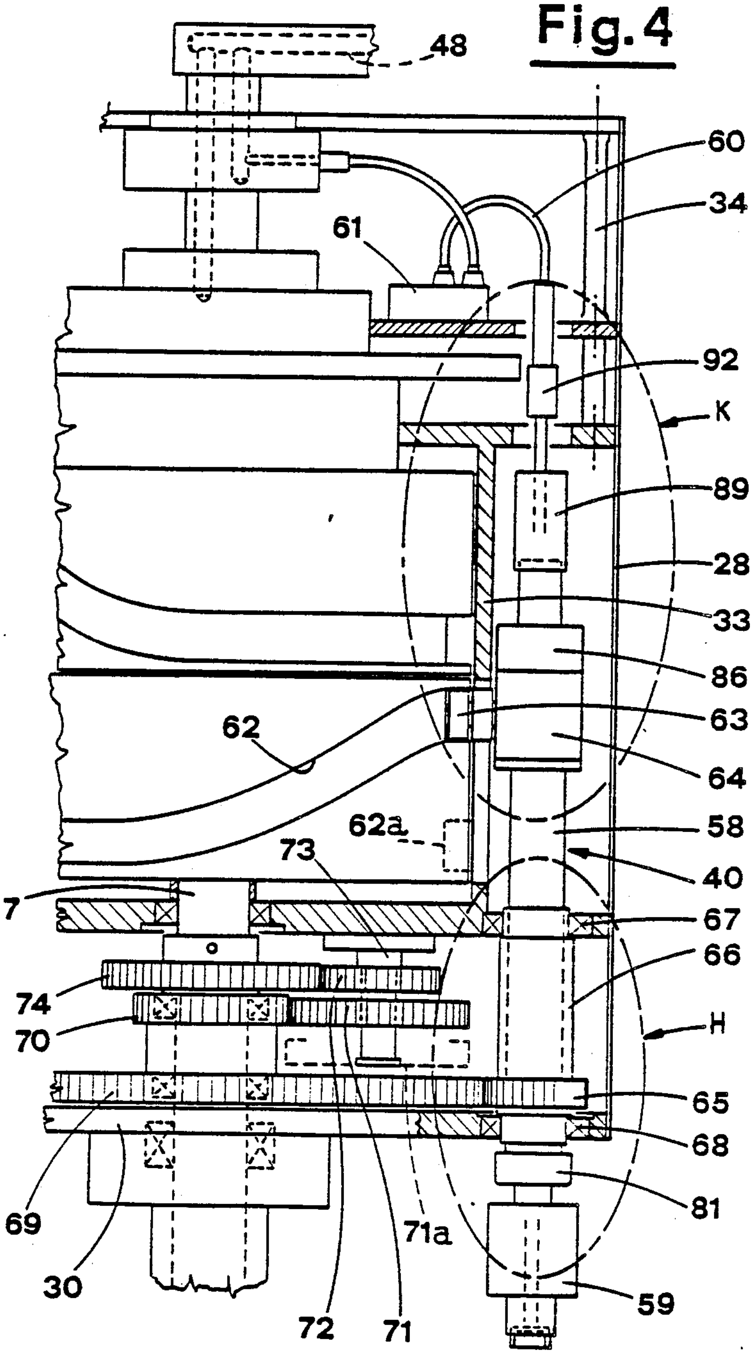
Figure 4A:
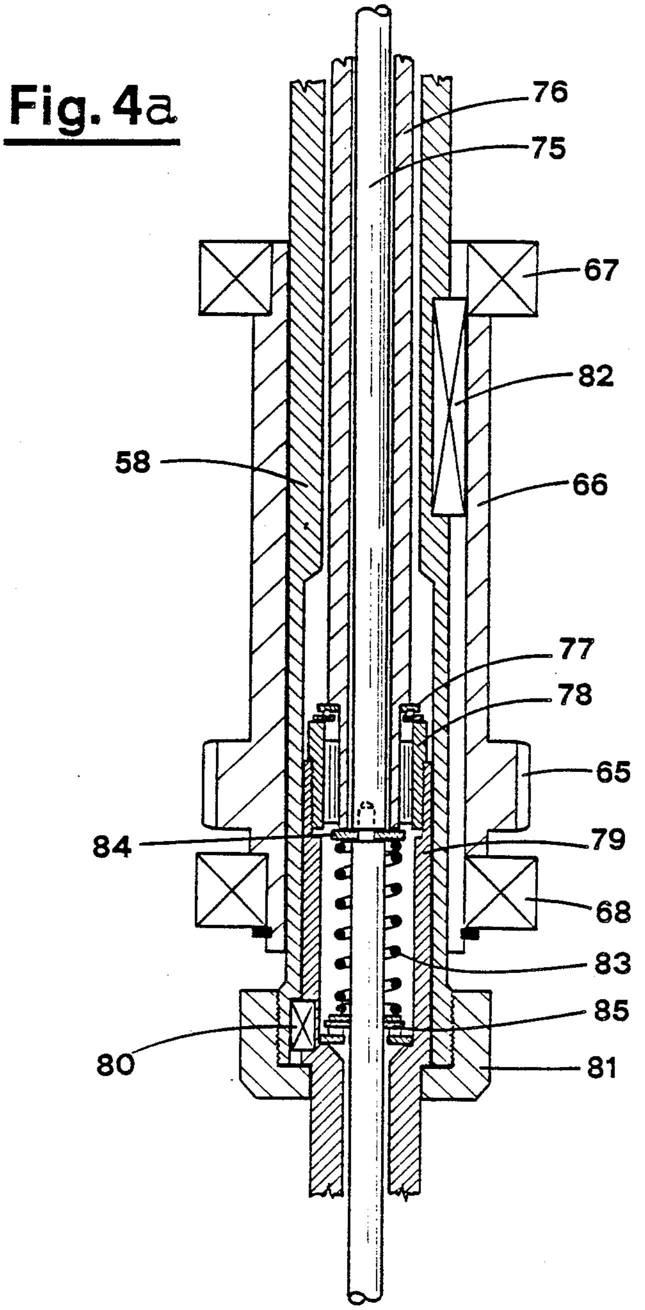
Figure 4C:
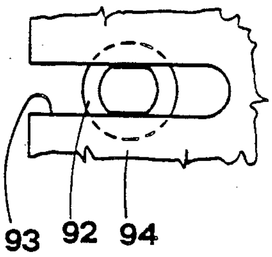
Figure 4B:
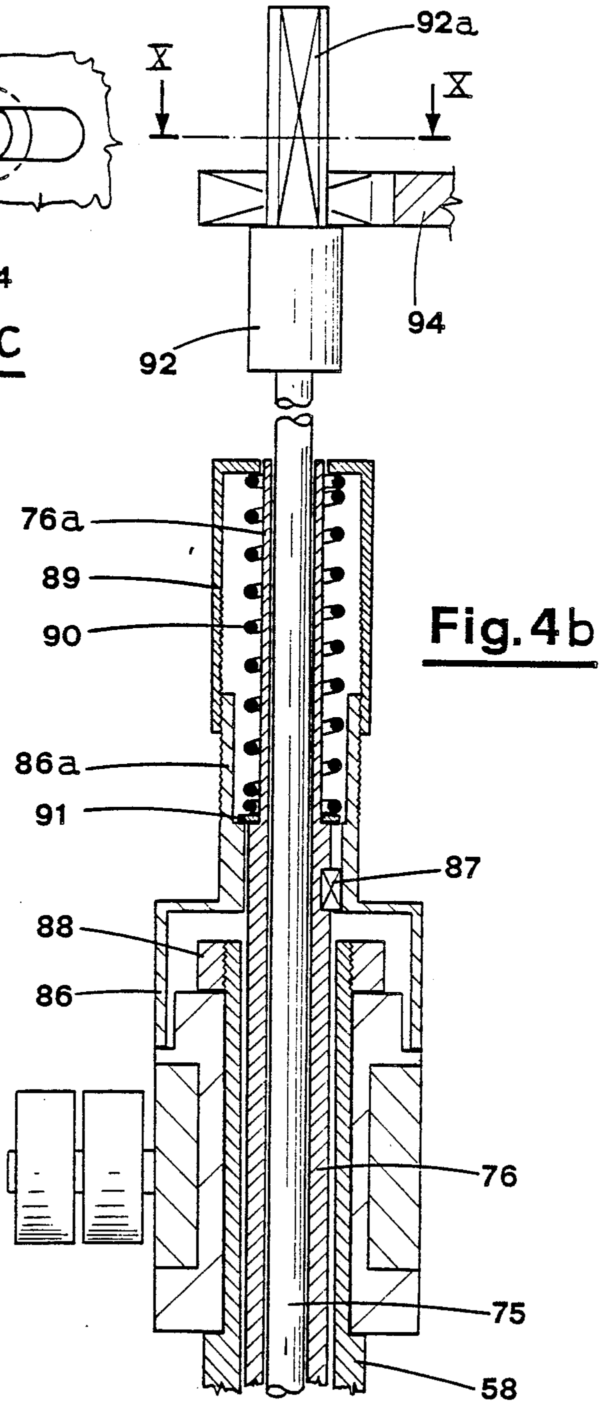
Figure 5:
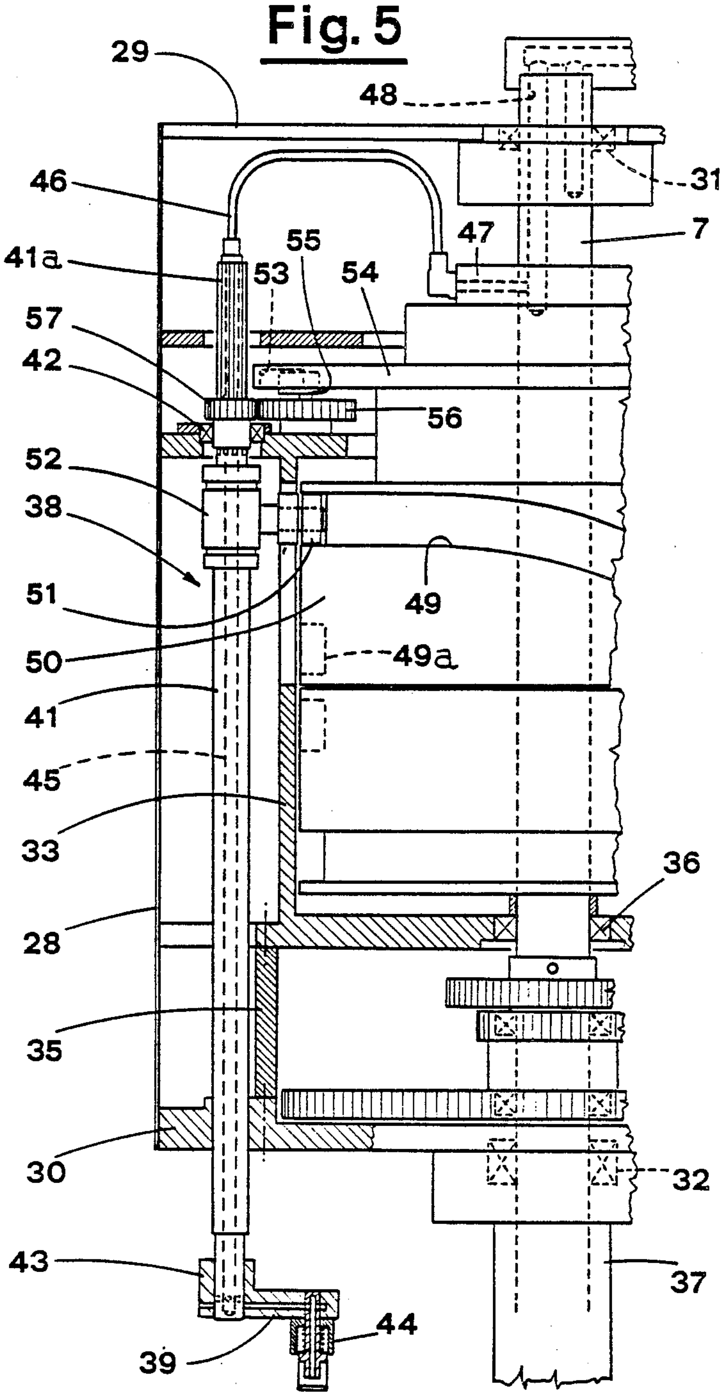

FIGS. **3*a*, 3*b*, 3*c*, 3*d* and 3*e*** respectively show the same plan view of the machine which is the subject of the present invention in different operating phases;

FIG. 4 is a partial vertical section of the said drum, showing the said plug gripping and insertion means;

FIGS. **4*a* and 4*b* show, on an enlarged scale, details H and K in FIG. 4**;

FIG. **4*c* shows the section along line X—X in FIG. 4*b***;

FIG. 5 is a partial longitudinal section of the said drum, showing the said gripping and insertion means for the under-plugs;

FIGS. 6 and 7 show sections respectively along line I—I and line II—II in FIG. **3*a***;

FIG. 8 shows the section along line III—III in FIG. **3*b***;

FIG. 9 shows the section along line IV—IV in FIG. **3*c***;

FIG. 10 shows the section along line V—V in FIG. **3*d***;

FIG. 11 shows a similar view to the previous figure but in a different operating mode of the machine;

FIGS. 12 and 13, finally, show, respectively, a vertical section and plan of the said vial gripping means.

DESCRIPTION OF THE PREFERRED EMBODIMENT

With reference to these figures, the machine which is the subject of the present invention comprises a rotating drum 1, the periphery of which features gripping means 2 (FIG. 12) for the vials 3, and a series of angularly equidistant insertion devices 4 for inserting an under-plug 5 and plug 6 in the neck of a related vial. The drum 1 is mounted so that it is able to turn upon a column 7 which rises vertically from a fixed frame 8, and is reinforced by a bracket 9; the frame 8 features a control board 10.

A distributor carousel 11 for the vials 3 and under-plugs 5 is designed to work in conjunction with the rotating drum 1; as is a further distributor carousel 12 for the plugs 6. The vials 3 are sent in an ordered succession to the carousel 11 by means of a screw conveyor 13 located at the exit of a feed line 14. The plugged vials are removed from the carousel 12 by a similar screw conveyor 15 located at the entrance of an outfeed line 16. The screw conveyors 13 and 15 are driven by related motor means 17 and 18. The under-plugs 5 and plugs 6 are in their turn sent to carousels 11 and 12 by conventional feed means, 19 and 20 respectively, in communication with related magazines 21 and 22.

The carousels 11 and 12 similarly comprise a series of discs 23 fitted, at a suitable distance from one another, to related vertical shafts 24 and 25 that counter-rotate in relation to the drum 1, as shown by arrows A, B and C in FIG. **3*a*. The discs 23 touch the circumference of path D upon which the axes of the vial gripping means 2 are distributed on the drum. The periphery of the discs 23** features a series of semi-circular compartments 26, designed to work in conjunction with opposing annular stops 27, fitted for the distribution of the vials 3, under-plugs 5 and plugs 6 respectively. More specifically, as illustrated in FIGS. 6 and 7, each carousel features a pair of discs 23*a*, 23*b*, which are designed to engage with the body of the vials 3; and a disc 23*c*, located above, which is designed to engage with the under-plugs 5 and plugs 6 respectively.

The rotating drum 1 comprises a cylindrical jacket 28 which forms an integral part with a pair of heads 29 and 30, upper and lower respectively, that are able to turn upon the column 7, due to the interposition of rolling bearings 31, 32 (FIGS. 4 and 5). The drum 1 is stiffened internally by a cage 33 which is fixed to the heads 29 and 30 by means of tie-rods 34, 35, and is in its turn able to turn upon column 7 due to the interposition of rolling bearings 36. A tubular shaft 37 is fixed to the lower head 30, extending below the drum 1, and is driven in rotation by motor means that are not shown in the drawing.

The insertion devices 4 respectively comprise a gripping and insertion means 38 for the under-plug 5, featuring a swinging arm 39 that moves from a gripping position in which it grips the under-plug itself, and a position in which it inserts the under-plug in the neck of the vial 3; and a gripping and insertion means 40 for the plug 6, that is able to move along its axis above the said vial.

The under-plug insertion means 38 comprises a rod 41 which is guided so that it is able to slide on the roating drum 1, with its axis slightly offset from that of the gripping means 2 for the vial to be plugged, and protrudes downwards from the head 30; the means 38 are also able to turn angularly upon a bearing 42 mounted on the cage 33 (FIG. 5). A sleeve 43, from which an arm 39 extends radially, is fixed to the lower end of the rod 41; the free end of the arm 39 mounts a gripping member 44 for the under-plug 5.

The rod 41 features an axial suction duct 45 which continues inside the arm 39 and is in communication with the gripping member 44. A the top of the rod 41, the duct is connected, by means of a hose 46, to an annular union 47 mounted on column 7; the union 47 is mounted on the drum 1 in such a way that it is able to turn, and is designed to be brought into communication, at a certain stage in the operating cycle of the machine, with a duct 48, inside the column 7 and rod 9, connected to known suction means.

The rod 41 is operated with an alternating axial motion by means of an annular cam 49 in the skirt of a cylinder 50 located inside the cage 33 and fixed to the column 7; the broken line 49*a* indicates the maximum excursion of this cam. The cam 49 is engaged by a roller 51 which is mounted on a sleeve 52 fixed to the rod 41 so that it projects along a horizontal axis.

The rod 41 is operated so that it rotates angularly by means of an annular cam 53 in the lower surface of a plate 54, the upper part of which forms an intergral part of the cylinder 50. The cam 50 is engaged by a roller 55 that is mounted eccentrically in the vertical axis on a toothed wheel 56 which is mounted upon the cage 33 in such a way that it is able to turn. The toothed wheel 56 engages with a pinion 57 mounted so that it is able to slide along a splined portion 41*a* of the rod 41. The plug insertion means 40 comprise a tubular spindle 58 that is mounted, in axis with the gripping means 2 for the vial to be plugged, on the said drum 1 in such a way that it is able to turn and slide longitudinally, its lower end protruding from the head 30 (FIG. 4). The lower end of the spindle 58 features a plug-gripping means 59, and its top end is connected by a hose 60 to a union 61, in communication with the suction duct 48, which is mounted on the drum 1 in such a way that it is able to turn.

The spindle 58 is operated with an alternating motion by a further annular cam 62 in the skirt of the cylinder 50; the broken line 62*a* indicates the maximum excursion of this cam. The cam 62 is engaged by a roller 63 that is mounted so that it projects along a horizontal axis upon a sleeve 64 that is locked to the upper portion of the spindle 58.

The spindle 58 is made to rotate by a gear train that engages with a toothed wheel 65, whose shape is dictated by a sleeve 66 mounted on the lower portion of the spindle itself; the sleeve is mounted so that is able to turn by means of bearings 67 and 68 on the drum 1. The said gear train comprises a toothed wheel 69 which engages with the wheel 65 of the sleeve 66 and is mounted so that it idles on the column 7; a coaxial pinion 70, forming an integral part of the idle wheel 69, engages with the first of a pair of wheels 71, 72, of greater and lesser diameter respectively, that are mounted in such a way that they are able to turn on a pin 73 which protrudes downwards from the cage 33; the second of these pairs of wheels in its turn engages with a toothed wheel 74 that is fixed to the column 7. As is stated in detail below, the pair of wheels 71, 72 may be moved along their axis in to the position shown by the broken line 71*a* in order to decouple the spindle from the gear train.

A suction pipe 75 inserted within a sleeve 76 (FIGS. 4*a* and 4*b*) is located within the spindle 58. The sleeve 76 is supported at its lower end by an axial bearing 77, and a brass 78 which is screwed into the top of a bush 79 that engages with the base of the spindle 58; the bush 79 is coupled to the spindle by a key 80 and is locked in place by a lock ring 81 that is screwed on to the spindle itself. The spindle 58 is coupled to the sleeve 66 where its rotating motion is concerned, but free to slide along its axis, by means of a further key 82. The sleeve 76 is supported by a helical spring 83 acting between a washer 84 mounted on the pipe 75 and a thrust bearing 85 located in the base of the bush 79. The lower end of the bush 79 serves to guide the pipe 75 inside the plug gripping means 59.

The sleeve 76 projects from the upper end of the spindle 58, passing through a cap 86, with a hole in its axis, that rests on the sleeve 64 and is coupled to the spindle itself by means of a key 87; the sleeve 64 is locked to the spindle by a lock ring 88. The upper part of cap 86 features a tubular portion 86*a* that is threaded on the outside, with an end cap 89, featuring an axial hole through which the pipe 75 passes, being screwed to this latter tubular portion 86*a*. The end cap 89 acts an adjustable stop for a helical spring 90, the other end of which rests on a washer 91 that is mounted on the shoulder formed by an upper portion 76*a* of the sleeve 76 which has a smaller diameter.

The top end of the pipe 75 is coupled to the hose 60 by means of a union 92. The union 92 features opposing longitudinal flattened portion 92*a* which enable it to be prismatically coupled with a slot 93 in a guide 94 that is an integral part of the drum 1 (FIG. 4*c*).

The vial gripping means 2, illustrated in detail in FIGS. 12 and 13, comprise, respectively, a gripper with two jaws 95, mounted on a rotating platform 96 that forms an integral part of the tubular shaft 37 below the drum 1. The jaws 95 are mounted transversely on pins 97 that are able to turn, with their axes in the vertical plane, in related bushes 98 inserted in suitable seats that pass through the platform 96; below the platform, the pins 97 feature related toothed wheels 99 that engage with one another. The opening and closing movement of the jaws is effected by means of an annular cam 100 in the upper surface of a plate 101, which is an integral part of the fixed frame 8 of the machine below the platform 96. The cam 100 is engaged by a roller 102, mounted projecting on a link rod 103 that is radially mounted to the pin 97 of one of the jaws of the gripper.

The operating cycle of the machine as in the present invention involves the vials 3 to be plugged and the under-plugs 5 being fed to the carousel 11, upon which they are evenly distributed in the compartments 26 of the discs 23, which work in conjunction with the annular stops 27 (FIG. 3*a*). The carousel 11 aligns each under-plug 5, situated in the upper disc 23*c*, with a related vial 3, situated in the lower discs 23*a*, 23*b* (FIG. 6).

Figure 1:
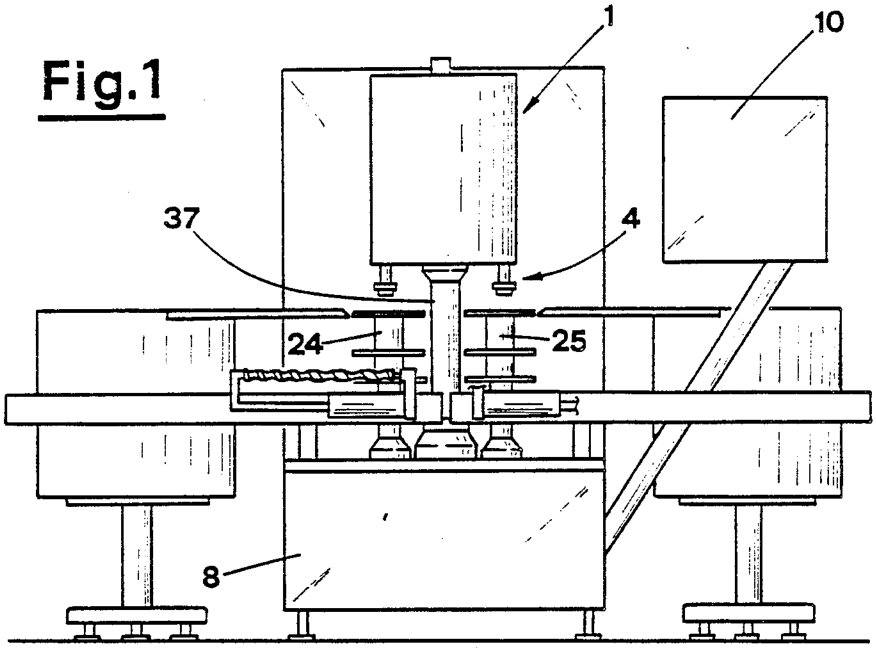
FIG. 1 is a diagrammatic side view of the machine which is the subject of the present invention.
Figure 2:
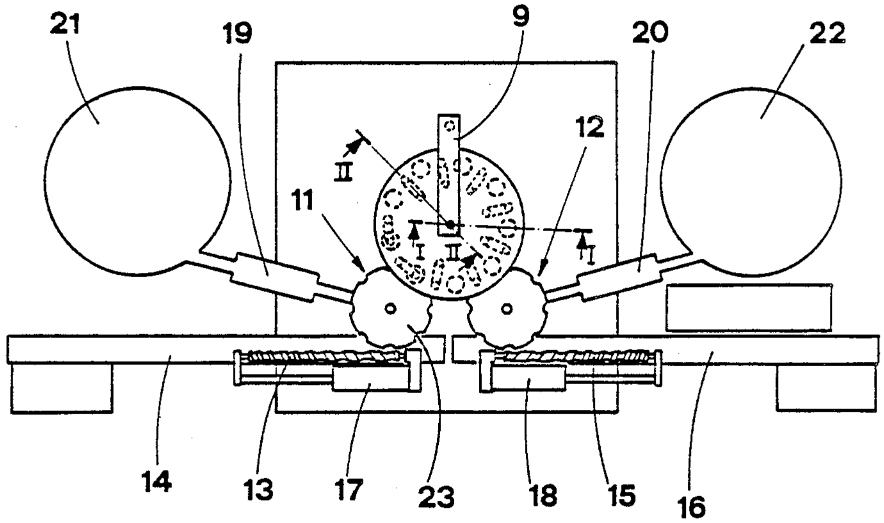
FIG. 2 is a diagrammatic plan of the same machine.
Figure 3B:
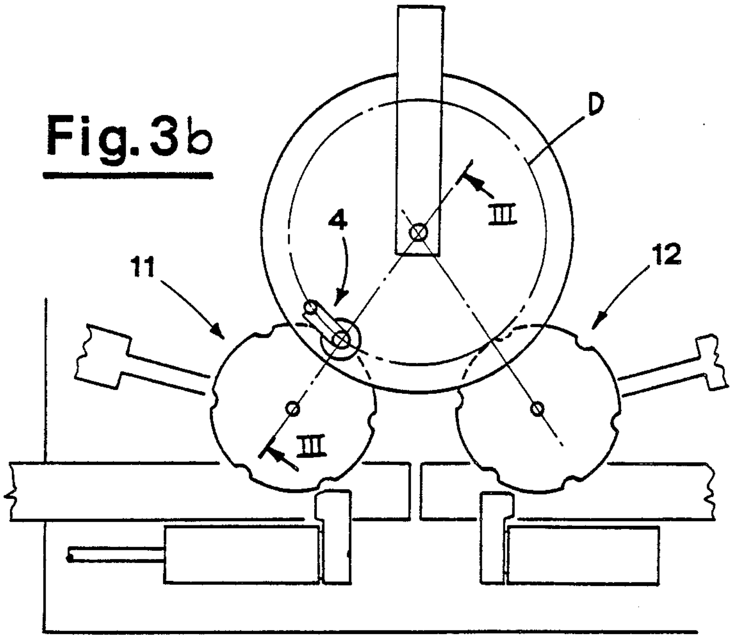

At the same time, the other carousel 12 is fed with the plugs 6 which are, in a similar fashion, distributed in the compartments of the related upper disc 23*c*. The rotation of the carousel 11 conveys the vial 3 and under-plug 5 below the counter-rotating drum 1, to the circumference of path D, intersecting the axis of the insertion devices 4; similarly, the rotation of the further carousel 12 conveys the plug 6 to a different point on this circumference (FIG. 3*b*). The drum 1 and carousels 11 and 12 are driven so that they rotate by the motor means of the machine. The peripheral velocity of the carousels 11 and 12 is the same as that of the drum 1 at circumference D, such that their relative velocity at the point of contact is zero. This enables the insertion devices 4 to be successively aligned with the plugs 6 and with the under-plugs 5 and the vials 3.

Following the direction of rotation C of the drum 1, each insertion device 4 is first brought into alignment with the plug 6, distributed by carousel 12, and subsequently with the under-plug 5 and vial 3, distributed by carousel 11. In this aligned position, the plug 6 is picked up by the gripping means 59 of the spindle 58 which is operated along its axis by means of cam 62, and is connected to a suction source by means of the pipe 75 (FIG. 7); the under-plug is picked up by the gripping member 44 of the arm 39, in its turn connected to the suction source by means of the axial duct 45 of the rod 41 (FIG. 8). The vial 3, on the other hand, is gripped between the jaws 95 of the gripping means 2 below it.

It should be noted that when the under-plug 5 is in its gripped position, the arm 39 is angularly rotated in such a way as to bring the gripping member 44 into axial alignment with the under-plug itself, below the spindle 58.

Figure 3C:
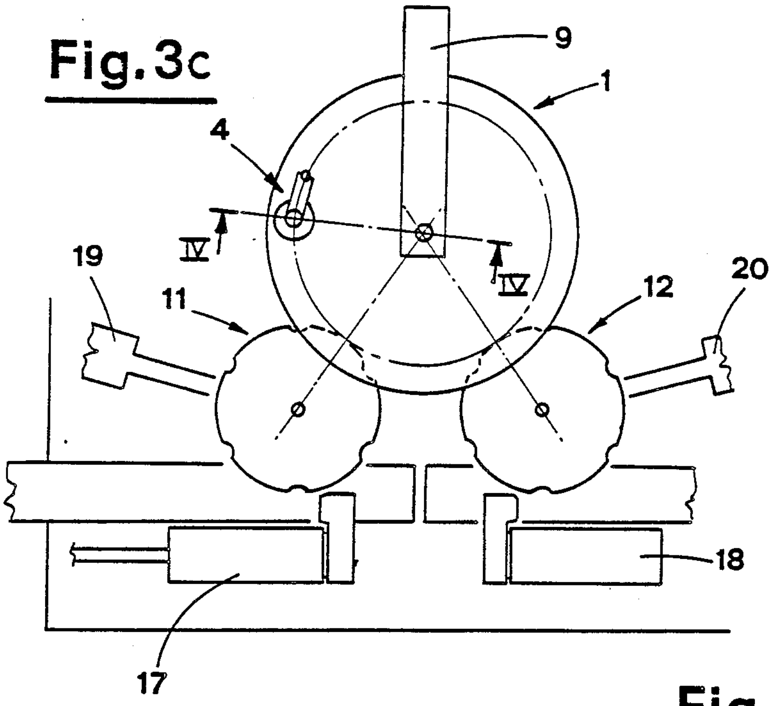

Once the vial 3, under-plug 5 and plug 6 have been gripped, and the drum 1 has moved to the position shown in FIG. 3*c*, the rod 41 is lowered through the action of the fixed cam 49. The under-plug 5 is thus inserted in the neck of the vial 3, as can be seen in FIG. 9, and in detail P.

Figure 3D:
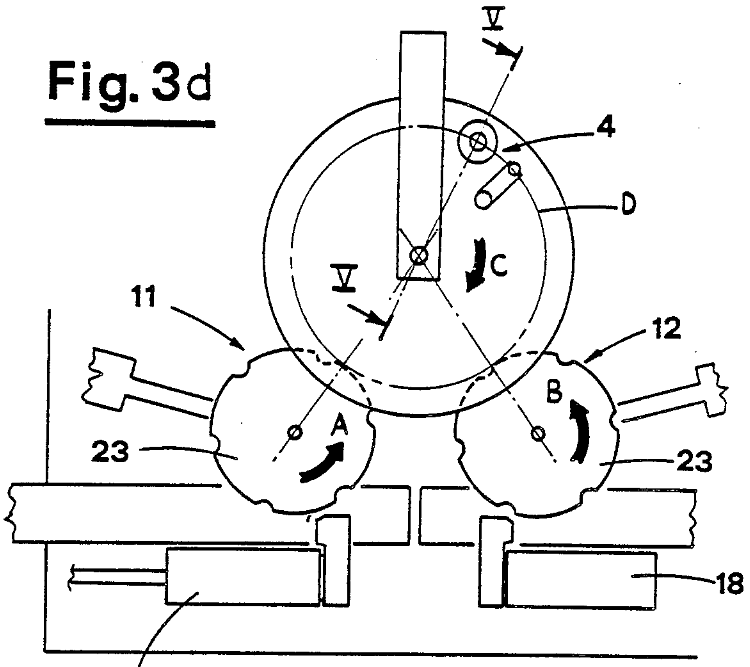

The rotation of the drum 1 continuing, the rod 41 is raised and, through the action of cam 53, which causes the angular rotation of the mutually engaged toothed wheels 56 and pinion 57, the rod 41 is made to rotate correspondingly; the arm 39 moves to a position that is substantially radial to the drum 1, in such a way as to disengage the vertical axis of the vial (FIG. 3*d*). This enables the subsequent lowering of the spindle 58 to be effected, through the action of the fixed cam 62, in such a way as to fit the plug 6 to the neck of the vial 3, as shown in FIG. 10 and in detail Q.

Depending on the type of vial, it is possible, as an alternative, to screw in the plug 6 instead of insert it under pressure. To this end, the spindle 58 is made to rotate by the gear which is driven by the satellite wheel 72 (FIG. 11). The movement of wheels 71, 72 to position 71*a*, vice versa, causes the gear to be de-coupled.

It should be noted that, during insertion of a plug under pressure, the spring 90 opposes the relative sliding movement of the sleeve 76, with pipe 75 within, in relation to the spindle 58. This effects an elastic coupling that enables the vertical oscillating movements imparted to the plug-gripping means 59, mounted on sleeve 76 by means of the bush 79 located between them, to be absorbed; the spindle 58, on the other hand, completes a stroke that is rigidly delimited by cam 62.

The plugged vials are finally removed from the carousel 12 at the gripping position for the plugs 6 by the insertion devices 4, and unloaded onto the outfeed line 16.

What is claimed is:

1. A rotating multi-station machine for inserting an under-plug and plug in vials and similar containers having a neck, said machine comprising a fixed frame, a rotating drum having gripping means for said vials on its periphery, and a series of angularly equidistant insertion devices for inserting said under-plugs and plugs in necks of related vials; a first distributor carousel for supplying said vials and said under-plugs to said rotating drum: feed means for feeding said vials and said under-plugs to said first distributor carousel; a second distributor carousel for supplying said plugs to said rotating drum; and removal means for plugged vials; said insertion devices comprising: first gripping and insertion means for said under-plugs having a swinging arm movable between a work position at the neck of a said vial and a vial-disengaged position in which said arm is disengaged from the neck of said vial; second gripping and insertion means for inserting a plug in a said vial, said second gripping and insertion means reciprocally movable above said vial.

2. A machine as in claim 1, wherein said first gripping and insertion means comprises a rod guided to slide and turn angularly upon said rotating drum, the axis of said rod being slightly away from the axis of said vial gripping means for the vial to be plugged, said arm being radially locked to a bottom end of said rod, a free end of said arm having a gripping member for said under-plugs mounted thereon, and said rod having an axial suction duct which continues within said arm and is in communication with said gripping member.

3. A machine as in claim 2, wherein said rod is operated with a reciprocating axial motion by means of an annular grooved cam engaged by a roller mounted on a sleeve locked to said rod so that said roller projects along a horizontal axis, said grooved cam formed in a skirt of a fixed cylinder located inside said drum.

4. A machine as in claim 2, wherein said rod is operated to rotate angularly by means of a pinion sliding along a splined portion of said rod and engaging with a toothed wheel rotatably mounted upon said drum, said toothed wheel having a roller mounted eccentrically and rotating around a vertical axis and engaging with an annular cam in a lower surface of a plate forming an integral part of said fixed frame of said machine.

5. A machine as in claim 2, wherein said duct is at the top of said rod connected by means of a hose to an annular union rotatably mounted on the drum which is brought into communication, at a certain stage in an operating cycle of said machine, with a duct leading to suction means.

6. A machine as in claim 1, wherein said plug insertion means comprise a tubular spindle mounted axially with said gripping means of said vial to be plugged on said drum to turn and slide longitudinally, the inside of said tubular spindle having a suction pipe a bottom end of which is connected to a plug-gripping means and a top end of which is connected by a hose to a union rotatably mounted on said drum which is in communication with a duct connecting said plug-gripping means to suction means.

7. A machine as in claim 6, wherein said spindle is operated with a reciprocating motion by an annular cam in the skirt of a cylinder located within said drum and integrally formed as part of said fixed frame of said machine, said cam being engaged by a roller horizontally mounted upon a sleeve locked to an upper portion of said spindle.

8. A machine as in claim 6, wherein said spindle is made to rotate by a gear train engaging with a toothed wheel engaged by a sleeve mounted on a lower portion of said spindle and coupled with said spindle so that said sleeve rotates in the same direction as said spindle, said gear train comprising a series of toothed wheels for transmitting the motion imparted by a further toothed wheel rotatably mounted on said drum and engaging with a toothed wheel that is an integral part of said fixed frame of said machine and is axially aligned with said drum, at least one of said wheels being movable along its axis to disengage said spindle from said gear.

9. A machine as in claim 6, wherein said suction pipe is located within a sleeve supported at its bottom end by means of an axial bearing, a coupling fastened to the top of a bush in close fitting relationship to the bottom of said spindle and coupled to said spindle by a key, said sleeve also being supported by a helical spring acting between a washer mounted on said suction pipe, and a thrust bearing located in the bottom of said bush.

10. A machine as in claim 6, wherein said suction pipe is located in a sleeve with its upper end protruding from said spindle and passing through a cap coupled to said spindle itself and having a tubular portion on its upper end threaded on the outside to said tubular portion, an end cap being screwed and acting as an adjustable stop for one end of a helical spring, the other end of said helical spring resting on a shoulder in said sleeve.

11. A machine as in claim 6, wherein said suction pipe is connected to a hose by means of a union having opposing longitudinal flattened portions enabling said union to be coupled with a slot in a guide that is an integral part of said drum.

12. A machine as in claim 1, wherein said first and second carousels are of similar construction and comprise a series of discs mounted, at suitable distance from one another, on related vertical shafts and that rotate in the opposite direction to said drum, said discs touching the circumference upon which the axes of said vial-gripping means are distributed on said drum.

13. A machine as in claim 12, wherein the periphery of said discs having a series of semi-circular compartments designed to work in conjunction with opposing annular stops fitted for distributing said under-plugs and plugs respectively.

14. A machine as in claim 12, wherein each carousel has a pair of discs to engage with the body of said vials, and a further disc located above said pair of discs to engage with said under-plugs and plugs respectively.

15. A machine as in claim 1, wherein said rotating drum comprises a cylindrical jacket integrally forming an upper head and a lower head which turn upon a fixed column, a tubular rotatable shaft fitted to the lower head and extending beneath said drum.

16. A machine as in claim 1, wherein said vial-gripping means comprise a gripper with two jaws mounted on a rotating platform an integral part of said drum, respective pins of said jaws having related toothed wheels engaging with one another, said gripper being operated by means of an annular cam on the upper surface of a plate which is an integral part of said fixed frame of said machine, a roller engaging with said annular cam and being mounted projecting on a link rod radially mounted to said pin of one of said jaws of said gripper.

17. A machine as in claim 1, wherein said feed means for supplying said vials to said first distributor carousel comprise a screw conveyor located at the end of a feed line.

18. A machine as in claim 1, wherein said plugged vial removal means comprise a screw conveyor located at the beginning of an outfeed line, and are fed by said second carousel.

* * * * *